Feb. 24, 1931.  J. E. FISHER  1,794,007
PRODUCTION CONTROL SYSTEM
Filed Jan. 18, 1930   2 Sheets-Sheet 1
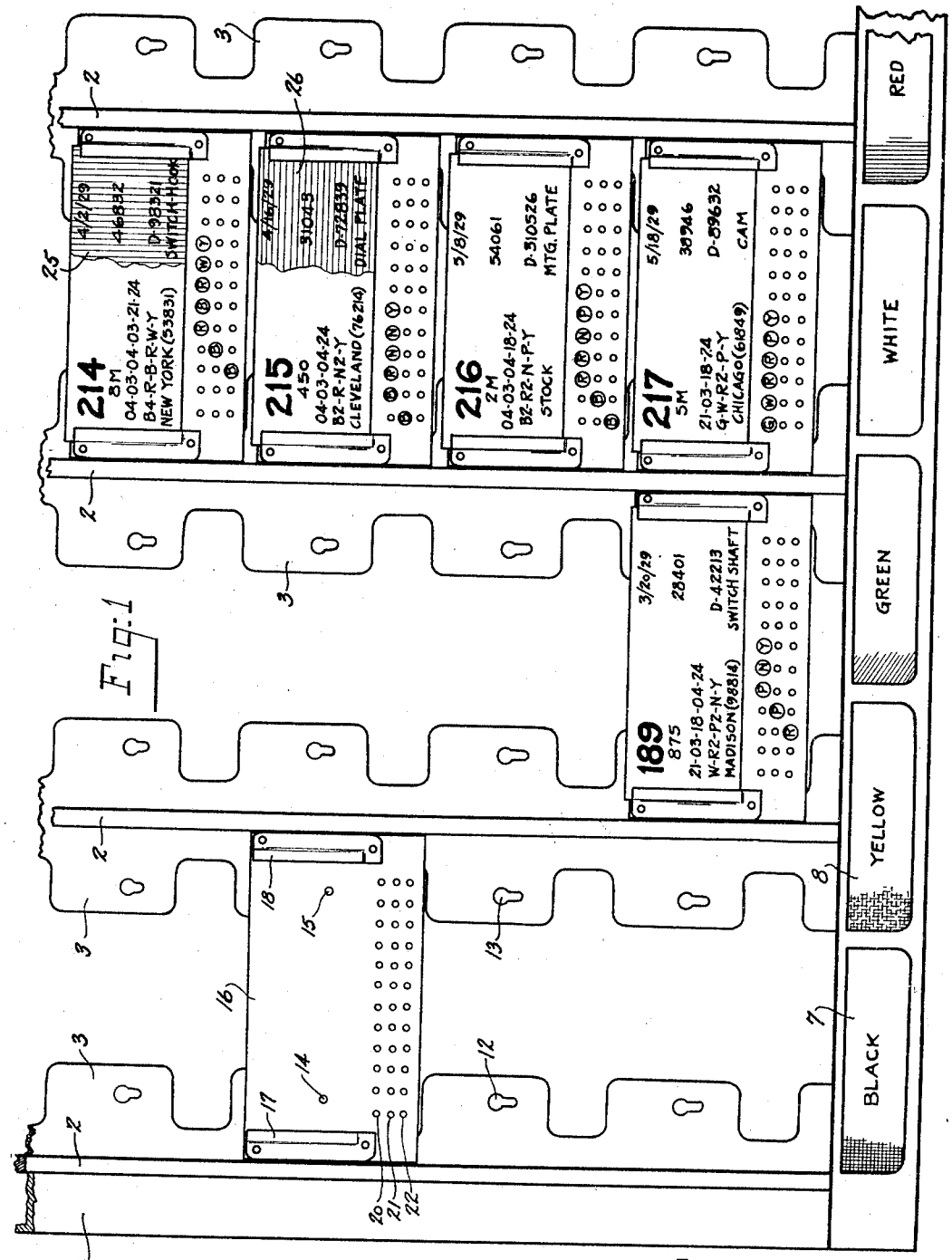
Inventor
John E. Fisher

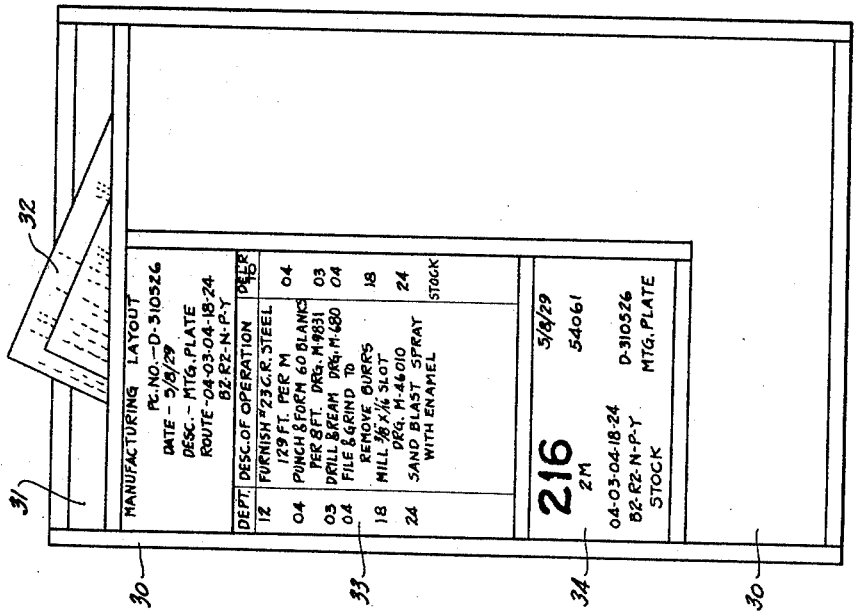
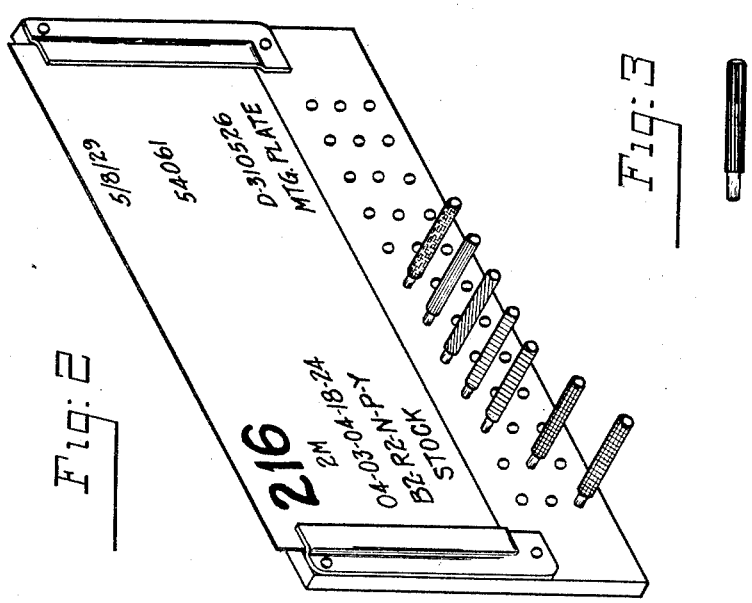

Patented Feb. 24, 1931

1,794,007

UNITED STATES PATENT OFFICE

JOHN E. FISHER, OF CHICAGO, ILLINOIS, ASSIGNOR TO AMERICAN ELECTRIC COMPANY, INC., OF CHICAGO, ILLINOIS, A CORPORATION OF DELAWARE

PRODUCTION-CONTROL SYSTEM

Application filed January 18, 1930. Serial No. 421,664.

This invention relates in general to production control systems, but more particularly to a production control system for use in a factory for controlling the production of and operations performed on various piece parts or other manufactured products, and the principal object of the invention resides in the provision of an efficient and reliable system of inexpensive construction and simple operation for regulating and controlling the progress in the production of manufactured articles or piece parts.

In the production of manufactured piece parts or articles, it has been heretofore the practice to employ a number of clerks whose sole duty it was to constantly schedule and take care of the progress records of the various manufactured parts in their sequence of operation throughout the various departments of the manufacturing company. This method entails considerable work in checking the records, and in addition would not be at all times available at the proper time to the person most concerned in the proper supervision of the manufactured parts. It is accordingly an object of this invention to dispense with the clerical work of this nature and eliminate the objectionable progress records.

In the previous methods of controlling the manufacture of piece parts, it was impossible for a supervisor of a certain group of machines or departments to be aware at any time of the exact status of a particular manufactured object or product, without consuming a great deal of time in checking over the progress records. In addition, the supervisor would not be aware of the number of subsequent jobs which he will have under his supervision, or he would not be aware at any time of the exact status of any particular job or manufactured product so that he could not properly supervise the actual work being done on the job or know to which assistant operator he might assign the subsequent job to. The foregoing is therefore a large factor in retarding the efficient production of the articles.

It is an object of this invention, therefore, to eliminate the aforesaid objectionable features of previous systems of production control, and provide a system wherein the supervisor of a particular department of a manufacturing concern would instantly and at all times be aware of the exact status of any particular job and its relation with respect to any subsequent or previous job which he may now be supervising, so that he will be relieved of checking all progress records and be better able to supervise manufacturing of the products without concerning himself with minor details.

A feature of this production control system resides in the provision of a control board or rack, centrally located, and having removably mounted thereon a plurality of small detachable card holders or sections having job tickets each of which corresponds to a particular job. These sections are arranged in consecutive order on the control board and indicate to a supervisor all the necessary data concerned with the production of a particular manufactured product.

A further feature of the invention resides in the provision of a plurality of multi-colored pegs representing particular operations on a job, which are inserted in rows of holes in the sections that indicate the particular status of that job associated with the colored peg.

Another feature of the invention resides in the provision of a job ticket that is removably inserted on the card holder or panel and contains information relative to a particular job and also a code whereby the various colored pegs representing different operations on the manufactured products are arranged in the order in which they are to be taken care of, and in addition the routing through the various departments which are to do the work on this particular manufactured product.

The above and other objects and features, not specifically pointed out will be evident from the detailed description which together with the drawings, constitute a preferred embodiment of the invention.

In the drawings comprising two sheets, Fig. 1 illustrates a section of a front elevation of the control board or rack with a number of panels or card holders mounted thereon and also a number of blank spaces from which the card holders had been removed so that details of the construction of the control board are more readily apparent.

Fig. 2 illustrates a single card holder or panel having a job ticket mounted thereon with the necessary manufacturing information and in addition a number of various colored pegs inserted in the holes on the lower side of the panel.

Fig. 3 illustrates a side elevation of one of the pegs in order to show its construction.

Fig. 4 shows a flat leather bag which is routed through the various departments with the manufactured product, and has a pocket for blue prints and other data, and in addition on the front thereof, a celluloid cover under which the manufacturing layout and a duplicate of the job ticket is inserted.

Referring now more particularly to Fig. 1, this illustrates a section of the control board, which it will be appreciated can be enlarged or extended to any desired height or width desired to accommodate more or less card holders and in accordance with the number of different manufactured products or jobs which are to be controlled by a particular department or group of departments. This control board is preferably of rectangular or square shape and comprises angle iron braces 1 arranged on each of the sides and riveted together so as to rigidly hold the board and the various parts together as a unit. Mounted at intervals horizontally across the board are square-shaped bars of iron 2, which separate the various vertical rows of card holders. Mounted on the back of each bar 2 is an irregular-shaped flat metal mounted plate 3 upon which the card holders 16 are mounted. These particular mounting plates are arranged vertically across the rear of the control board and behind each bar 2. On each of the vertical projections of the mounting plates 3 there are bayonet slots 12 and 13 arranged on opposite sides. These are for the purpose of removably accommodating the card holders 16 by means of screws 14 and 15 projecting from the rear of each card holder. The head of each screw is inserted in the holes 12 and 13 and then moved downward into the slot so that the card holder will be locked in position. The card holder or panel 16 is constructed of phenol fiber or bakelite and is of rectangular shape. At each end of the card holder a metal plate 17 and 18 is riveted for the purpose of accommodating a job ticket. At the lower portion of the card holder 16, three rows of holes 20, 21 and 22 are drilled through the holder.

A number of colored trays 7, 8, etc., are mounted along the lower edge of the control board. These trays serve as containers for the associated colored pegs when they are not in use. The pegs, as illustrated in Fig. 3, are round and have a short portion of their length tapered so as to set into the holes in the card holder. They are knurled so that they can be easily inserted into the holes and slightly twisted so that they will not easily fall out. The pegs are coated with a colored enamel and each color corresponds to a particular operation to be performed on the piece part.

Each card holder, as has been stated, has provisions for holding a so-called job ticket, for example, job ticket No. 216. This number is assigned to a particular order for a piece part which is to be made and indicates the order in which this job is to be taken up for production and its association with the other jobs which are placed on the production board, the numbers all following in consecutive order. The job ticket has also printed on it other necessary manufacturing data, for example, immediately below the job ticket No. 216 is a character 2M, indicating that there are two thousand parts to be made. The numerals 04—03—04—18—24 indicate the number of the departments and their order in which the particular part is to be manufactured. Below the department numbers the characters B2—R2—N—P—Y is the code which indicates the number of pegs and their colors; B2 indicating two black pegs, R2 indicating two red pegs, N one nickel peg, P one pink peg, and Y one yellow. Below the color code the work "Stock" indicates that the manufactured part is to be placed in stock or as indicated on job ticket No. 214 the piece part's destination is New York, and after this the sales order number. At the upper right-hand corner of the job ticket the date of the order is placed. Immediately below this, the number 50461 indicates the manufacturing order number. The character D—310526 indicates the drawing number of the particular piece part to be manufactured, and below this the words "Mtg. plate", indicates the title of the part to be manufactured.

By referring to job tickets Nos. 189, 214, 215, and 217 it will be obvious that the information conveyed by any of the job tickets can be changed as desired in accordance with the different kinds of manufactured piece parts, as will be readily understood. The various colored pegs are inserted in the first horizontal row of holes of the card holder in accordance with the code number printed on the job ticket as will be later on pointed out.

Referring now to Fig. 4, the leather bag 30 has a pocket 31 in which the shop drawings or blue prints 32 are inserted. These drawings give complete information to the shop as to the dimensions, finishes, etc., of the part to be made. On the outside of the leather bag 30 the manufacturing layout 33 and a duplicate copy 34 of the job ticket is mounted in pockets with transparent celluloid covers through which the information may be read without removing the card and at the same time serve to keep the data clean. The leather bag and all the records it contains is conveyed with the material throughout the various departments until the parts are completed.

The manufacturing layout 33 on the front of the bag 30 has printed thereon, the piece number of the part, date, description, and route similar to that printed on the job ticket. This manufacturing layout card also contains information indicating how the particular piece part is made, such as sheering information, material required for a thousand parts, operation route list, and a condensed description of each operation and the tools required to complete it together with the finish. This layout or schedule is standard for each part to be made and is used also on all other similar orders. The departments which are to do the work are listed in the left-hand column while those to which the completed operation is to be delivered to are listed in the right-hand column. It will be understood, of course, that the various and different piece parts to be manufactured are each made in a different manner and different operations performed on them and, therefore, each of these job tickets and layouts will not necessarily have the same manufacturing information printed on them.

The complete operation of the production control system in connection with the control board will now be described, from the time that the order is received up to the complete finished product. In the example to be illustrated the job ticket No. 216 will be described. When an order is received for a particular piece part to be manufactured in the production department, the leather bag 30 is first fitted out including the manufacturing layout inserted on the front thereof. This manufacturing layout, as has been stated, furnishes the necessary information for each department and the operation it is to perform on this piece part. The job ticket is made in duplicate and is given the number 216 and all the necessary information thereon is taken from the manufacturing layout. Both copies are placed on the front of the leather bag below the layout card. Likewise, the necessary blue prints and other information is inserted in the pocket and the leather bag is then routed to the raw material department. The stock room or department 12 as illustrated, furnishes the necessary raw material and routes the bag together with the material to the first department on the list, which in this instance is 04. The production planner who has charge of this complete control board and the assignment of the various job tickets on to the control board, is notified that the leather bag and the raw material have been received. He removes the original job ticket from the leather bag and places it upon the control board on a card holder in a position so that it will be the last one on the board. In this manner all the job tickets with their numerals will be arranged on the control board in consecutive order, the last order received being the last one placed on the board.

After the job ticket No. 216 is placed in position on the control board, the production planner notes the color code on it which indicates the kind and number of operations to be performed, and picks out the corresponding colored pegs from the trays 7, 8, etc. These he removes from the black tray and insertes in the first and second holes of the first row of the card holder immediately below the job ticket. R2 indicates two red pegs and he places them in the third and fourth holes of the first row; N indicates one nickel colored peg and this is placed in the fifth hole of the first row; P indicates a pink peg and this is placed in the sixth hole; Y is the final peg and this is placed in the seventh hole of the first row.

It may be stated that, at this time, due to the fact that the pegs shown in Fig. 1 are viewed from their end, it would be inconvenient to illustrate the colors of them by cross-acting as indicated in Fig. 2, and for this purpose the first letter of the color is indicated in a circle representing the end of the peg.

As has been heretofore stated, these colored pegs represent certain operations to be performed on the particular piece part and any number of combinations of the following color code, which is given as an example, may be made; B or black indicates a punching or forming operation; N indicates nickel which is a bench operation such as filing; R indicates red which is a drilling or reaming operation; P indicates pink which is a milling operation; G indicates green which is an automatic screw machine operation; W indicates white for hand screw machine operation; and Y indicates yellow which is a finishing operation such as plating or enameling. Each of these operations may be performed by different departments or two or more may be performed by the same department, for example, the color code B indicating punching and forming, is performed by the department 04, N is a bench operation which is also performed by this department. A red peg indicates drilling and reaming and this is performed by the department 03. A pink peg indicating milling is done in department 18; a green and white peg is a screw machine operation and is done by department 21, while the finishing operation which is a yellow peg is completed by department 24.

From the above information it will be seen that job ticket No. 216 calls for two black pegs in the first hole and these indicate operations to be performed by the department 04. These operations are punching, representing the first peg, and forming, representing the second peg. The third and fourth pegs which are red represent a drilling and a reaming operation performed by department 03. The fifth peg which is nickeled, indicates a bench operation performed by 04 which has done previous work on this piece part. The sixth peg, which is pink, represents a milling operation performed by department 18, while the finishing operation, indicated by the yellow peg in the seventh hole, indicates that this work is to be performed by department 24.

From the foregoing it will be seen that the departments are to perform different kinds of operations on this particular piece part in the order indicated by the pegs in the first row, and the order in which the departments are listed on the job ticket indicates the order in which the particular piece part must be sent through the shop to be produced.

Each department after receiving the parts to be produced, from another department, will perform the particular work done by it and do it in a manner as indicated on the manufacturing layout. The duplicate job ticket No. 216 attached to the leather bag indicates to the person that is to do the work on the piece part, just which job ticket is associated with it on the control board. In this manner the control board job ticket is associated at all times with any particular job.

The foreman or supervisor of, for example, department 04, is at all times aware by consulting the control board of any new job which is placed upon the board and also knows the exact status of every job which he has anything to do with. Noticing the job ticket No. 216 and that his department 04 is first on the list, and also noting that the first black peg in the top row represents a punching operation, he removes the peg from the first row of holes and places it in the first hole of the second row. This indicates that the machine which is to do the work is about to be set up and he informs the operator of the machine which is to perform the punching operation to set up the necessary tools and be prepared to receive this particular piece part and perform the punching operation on it. When the operator receives the stock of piece parts and is to actually perform the work of punching out the piece parts, which in this instance on job ticket No. 216 are mounting plates, he removes the first black peg from the second row and inserts it in the first hole of the third row.

From the foregoing it is seen that all the pegs in the first row indicate that certain operations are to be done on the piece part, while a peg in the second row indicates that the machine is being set up or is set up to do the necessary work on the piece part, and when the peg is in the third row the work is actually being done on the piece part. It will also be seen that while all the pegs are arranged in consecutive order in the first row of holes, not more than one peg at a time can be in either the second or third rows.

After the operation has been completed on a particular part, the peg is removed from the last row of holes and placed into its associated color tray, it being no longer needed.

As the particular piece part is routed from department to department with each particular department performing a certain operation, it will be seen that the pegs are moved one at a time from the first row to the second row, then to the third row, and finally into the tray. When the last or yellow peg, which indicates the finishing operation on the part, is removed from the last row of holes and placed in a tray, the piece part has been completed by the departments. Job ticket No. 216 is then removed from the card holder and together with the leather bag of Fig. 4 is sent back to the record department where it is placed on file.

It will be appreciated that different piece parts to be made differ radically in construction and in the number of operations and kind of operations to be performed on them. It, therefore, follows that each job ticket has different information on it than any of the other job tickets. For example, job ticket No. 214 has been indicated as partially routed through the various departments and indicates first four black pegs, two operations of which have been completed on the piece part, one black one being run, another black operation in which the machine is set up, and a red operation indicating the next operation to be performed on the part. Each job ticket on the control board will be in a different state from any of the others because all of the machines are not operating at the same speed and neither are any of the departments manufacturing the piece parts in the same time. It, therefore, follows that while some of the tickets, such as 214, may be partially completed, ticket No. 217 which is the last one on the control board will not have been started, while ticket No. 189 has one white operation and one red operation completed; another red operation being worked on; a pink operation in which a machine is set up; and another pink operation which is to follow, together with a nickel and a yellow or finish operation. Therefore, all of the jobs are in different stages of completion and the supervisor of any department or a group of departments is instantly aware of the condition of any part which is to be manufactured by him and he knows by consulting the job ticket at what stage of the operation the part now is. He also knows what kind of an operation is to be done and the order in which it is to be done, and in addition knows which department is to do the work. He can, therefore, plan his work and set up the machines so that none of the machines will at any time be idle as long as the control board contains any job ticket.

As fast as the work represented by the job tickets and their associated pegs have been completed, they are removed from the control board thereby leaving a blank space on it. Due to the numerous operations on any particular piece part, it may be some time before it is finally completed and therefore several blank spaces appear throughout the control board when jobs requiring few operations are completed. Each morning, therefore, the production planner or the person having charge of the control board, moves up all the job tickets or card holders to the upper left-hand corner of the board so that all the blank spaces will be filled and the cards still remain in consecutive order although the tickets may not follow successively as the jobs in between may have been completed before those arranged subsequently. In this manner blank spaces are provided each day after the last card holder so that new job tickets may be added as the orders are received by the planner.

From the foregoing it is seen that no written records or progress records are required or that any clerical work is necessary except that the supervisor who is concerned merely with his own particular group of machines or department has control of the various operations indicated on the job ticket, and any official is at all times aware by merely glancing at the control board, of the amount of work being done in any department and how fast any particular piece part is being manufactured, and what its condition is at that time.

When any particular piece part represented by a job ticket on the control board requires immediate action or is urgently needed out of the regular turn in which it is set up on the control board, a blue transparent sheet of celluloid is inserted over the job ticket, such as the celluloid sheet 26 on job ticket No. 215. This indicates to the supervisor of the department having reference to this job ticket, that this particular order must be taken up before any subsequent or previous orders have been completed.

When a particular machine, represented by job No. 214, for example, is set up and breaks down on an operation, or when there is a change of design of the piece part to be manufactured, a sheet of red transparent celluloid 25 is inserted over the job ticket 214. This is an indication that the work on this job has been temporarily held up and further work on its will be suspended.

It will be obvious that there may be any number of variations from the example illustrated, such as the different operations performed on the different piece parts and also different piece parts routed to different departments. Likewise, this production control system is not necessarily limited to the production of any piece part as it may be applicable equally as well to assembling divisions or any other group of departments, and it will be appreciated that this may be used in any manner desired. It, therefore, follows that it is not necessary likewise that the various colored pegs represent different operations on a particular part, they may be associated with the various steps concerned with the assembling of a complete unit which may be a piece of machinery or any other assembled product.

Numerous possible modifications are possible with this type of production control system, and it is therefore not desired to be limited to the exact construction shown and described but only by the scope of the appended claims.

What is claimed is:

1. In a production control board, a mounting frame, a plurality of card holders removably attached to said frame, a job ticket removably mounted on each of said card holders, each of said card holders having a series of rows of holes in the holder below said job ticket, a plurality of different colored pegs inserted in the holes of said card holder, each colored peg representing a particular operation to be performed, the position of the colored pegs in the row of holes indicating the progress made on the operation corresponding to said peg.

2. In a production control board, a mounting frame, a plurality of card holders detachably secured to said mounting frame, job tickets inserted on said card holders and placed on said frame in consecutive order, said job ticket having information printed thereon corresponding to the number and kind of operations to be performed on a particular part to be manufactured and the various departments which are to do the work, said card holders having rows of holes positioned below said job ticket, different colored pegs inserted in said rows, each of said pegs corresponding to a particular operation to be performed on said part as indicated on said job ticket, the positions of said colored pegs in said holes indicating the progress being made on the associated operation, said pegs being removed from said card holder after said operation had been completed, and a plurality of colored trays corresponding to said pegs mounted on the lower edge of said frame for holding said pegs when not in use.

3. In a production control board comprising a supporting frame having angle iron sides and a plurality of vertical spaced rods, a vertically disposed mounting plate attached to each of said rods, a plurality of card holders removably attached to said mounting plates and arranged in consecutive order between each row of rods, job tickets corresponding to a particular part to be manufactured inserted in each of said card tickets in numerical order and having information thereon indicative of the manner and kinds of operations to be performed on said piece parts to be manufactured, said card holders having a plurality of rows of holes positioned below its associated job ticket, a plurality of colored pegs in said holes corresponding to the information of said job tickets and associated with the kind and number of operations to be performed on said part to be manufactured, a plurality of various colored trays mounted on said mounting frame on the bottom thereof and corresponding to said colored pegs, said pegs being removed from said holes in the card holder when the operation corresponding to the peg is completed and placed in said trays when not in use, said card holders and associated job tickets being moved forward on said mounting frame when the intermediate cards and card holders have the operation on the associated part to be manufactured completed.

4. In a system for controlling the production of manufactured piece parts wherein a mounting frame has detachably secured thereto a plurality of card holders each having inserted thereon a job ticket and all arranged in consecutive order on the mounting frame, said job ticket having information thereon relative to the number and kinds of operations to be performed on the piece part and also the department affected thereby, each of said card holders having a plurality of rows of holes below said job ticket and a plurality of colored pegs corresponding to the kinds and number of operations to be performed inserted in the first of said rows of holes in the order in which said operations are to be performed, the second row of holes indicating that the operations are ready to be performed on the piece part, while the third row of holes indicates that the parts are actually being operated on or in use and means for moving said pegs one at a time from said second to said third rows when said operation has been completed.

5. In a production control system for regulating the operation and the production of piece parts to be manufactured, a control board comprising a frame having a plurality of card holders detachably mounted thereon, job tickets inserted on each of said card holders and arranged on said board in consecutive order in accordance with the order in which said cards are placed on said control board, said cards containing manufacturing information relative to the number and kind of operations to be performed on piece parts also the various departments concerned with the operations thereof, each of said card holders having a plurality of rows of holes positioned below the associated job ticket, a plurality of colored pegs inserted in said holes and corresponding to particular operations as indicated on said job ticket and arranged in said rows in a manner to indicate the progress of the particular operation being done on said piece part, and a leather bag having provisions for holding blue prints and manufacturing data pertaining to said piece part and having inserted on the front thereof a manufacturing layout for indicating the exact manner in which the operations on said piece part and indicated by said colored pegs are to be performed, said leather bag having inserted on the front thereof a duplicate copy of said job ticket on said card holder said leather bag being associated with said piece part throughout the various operations from department to department as indicated on said job ticket.

6. In a system for controlling the production and operation concerned with the manufacturing of a plurality of piece parts a control board comprising a frame having a plurality of card holders detachably secured thereto, job tickets inserted on each of said card holders and arranged on said frame in consecutive order in accordance with the order in which they are received, each of said job tickets conveying information thereon relative to the kind and number of operations, the departments which are to do them, and the piece number and the title of the particular piece part to be manufactured, each of said card holders having a plurality of horizontally disposed rows of holes positioned below said job ticket, a plurality of colored pegs of a different color and associated with a particular operation indicated on said job ticket, said pegs being arranged consecutively in the first of said rows of holes in accordance with the order in which said operations are to be performed, said pegs being moved from one of said rows of holes to the next in accordance with the progress being made on the various operations performed so that an indication will at all times be given of the progress of any particular job or operation being performed on any of the piece parts on said control board, said job tickets and said associated colored pegs being removed from said control board when the particular piece part associated therewith has been entirely completed.

7. In a production control system for controlling the various operations concerned with the manufacture of piece parts, a control board comprising a metal frame having a plurality of card holders detachably secured thereto, job tickets associated with each of said card holders and having information thereon relative to the kind and number of operations to be performed on a particular piece part, each of said card holders having a plurality of rows of holes positioned below said job ticket, a plurality of various colored pegs associated with a particular operation as indicated on said job ticket inserted in consecutive order in said holes, said pegs being moved one at a time from one row of holes to the next in accordance with the progress made on the particular operation, said job tickets and card holders being arranged in consecutive order on said control board in such a manner that the first one placed thereon is the first one to be taken care of and a transparent colored marker placed over any of said job tickets to indicate that a particular job is to be worked on out of the regular order.

8. In a production control system for controlling the various operations concerned with the manufacture of piece parts, a control board comprising a metal frame having a plurality of card holders detachably secured thereto, job tickets associated with each of said card holders and having information thereon relative to the kind and number of operations to be performed on a particular piece part, each of said card holders having a plurality of rows of holes positioned below said job tickets, a plurality of various colored pegs associated with a particular operation as indicated on said job ticket inserted in consecutive order in said holes, said pegs being moved one at a time from one row of holes to the next in accordance with the progress made on the particular operation, said job tickets and card holders being arranged in consecutive order on said control board in such a manner that the first one placed thereon is the first one to be taken care of and made, a transparent colored marker placed over any of said job tickets to indicate that a particular job is to be worked on out of the regular order, and a different colored transparent marker placed over an associated job ticket when said job is temporarily held up due to break down of machines or a change in tool design.

In witness whereof, I hereunto subscribe my name this 13th day of January, A. D. 1930.

JOHN E. FISHER.